United States Patent [19]

Teumer

[11] 4,309,711
[45] Jan. 5, 1982

[54] HIDDEN GUTTER FOR INK JET RECORDING SYSTEM

[75] Inventor: Roger G. Teumer, Fairport, N.Y.

[73] Assignee: Xerox Corporation, Stamford, Conn.

[21] Appl. No.: 165,425

[22] Filed: Jul. 2, 1980

[51] Int. Cl.³ .......................................... G01D 15/18
[52] U.S. Cl. .................................. 346/75; 346/140 R
[58] Field of Search ........................ 346/1, 75, 140 IJ

[56] References Cited

U.S. PATENT DOCUMENTS

| | | | |
|---|---|---|---|
| 3,786,517 | 1/1974 | Krause | 346/75 |
| 3,877,036 | 4/1975 | Loeffler et al. | 346/75 |
| 3,955,203 | 5/1976 | Chocholaty | 346/75 |

*Primary Examiner*—George H. Miller, Jr.

[57] ABSTRACT

A multiple drop stream ink jet or fluid drop recording method and apparatus is described in which at least every other deflection electrode includes a gutter or drop collection device inside the electrode. The recording system for which the gutter deflection electrode is intended is one wherein each of the multiple drop streams has a a pair of deflection electrodes associated with it thereby leaving minimal lateral and forward space for a gutter device. The gutter is hidden. That is, the mouth to the gutter faces downstream and is not accessable by drops in flight. Rather, drops first impact collision surfaces on the sides of a gutter deflection electrode. The resultant fluid surface stream flows around a curved end surface of the gutter deflection electrode and enters the gutter through the downstream facing mouth.

14 Claims, 4 Drawing Figures

HIDDEN GUTTER FOR INK JET RECORDING SYSTEM

BACKGROUND

This invention relates to ink jet recording or printing method and apparatus. More specifically, the invention is directed toward novel method and apparatus for collecting unused drops in ink jet recording systems of the type wherein a continuous stream of drops are generated and selected drops are directed toward a target and others toward a collection or gutter device.

The continuous drop ink jet system reported by Richard Sweet in U.S. Pat. No. 3,596,275 includes a drop generator that creates a stream of discrete ink drops at a high rate, for example, 100,000 drops per second. The stream passes through a charging tunnel during which time individual drops are assigned a net charge of zero or some finite positive or negative value. Thereafter, the stream of drops flies between a pair of deflection plates having a steady state electric field established between them. The drops are deflected in the direction of the field proportionally to the charge on the drops. A drop collector or gutter is conventionally located between the deflection plates and a target to catch drops not intended for the target. The drops caught by the gutter are circulated back to the drop generator. When text information is being recorded, the number of gutter drops greatly exceeds the number of drops reaching the target. When pictorial information is being recorded, the number of gutter drops can go as low as two percent of the total number.

The gutter is clearly an important element of an ink jet system. But, the presence of a gutter creates packaging and system performance problems especially when the drop generator produces multiple, drop streams each flying between an associated pair of deflection plates. A separate gutter is required for at least every pair of drop streams in this architecture thereby tending to clutter the space between the ends of the deflection plates and the target and otherwise adding to the manufacturing problems and expenses of a recording system. Also, the distance between the ends of the deflection plates and the target should be minimized to enhance the printing operation. The less that distance, the less aerodynamic effects acting on the drops and charge interaction between drops cause drop placement errors on the target.

Accordingly, it is an object here to offset the above noted limitations associated with prior gutter devices employed in fluid drop printing systems using drops from multiple drop streams collectively to compose a record or print on a target. The terms "record" and "print", as well as variations hereof, are used interchangeably herein with no distinction between the two terms being intended.

Still another object of the invention is to remove the gutter devices from the space between the ends of the deflection electrode means and the target thereby enabling a reduction in that space.

Another object of this invention is to incorporate a gutter device into at least those deflection electrode means that are common or shared by adjacent fluid drop streams.

Finally, it is an object of the present invention to devise an improved fluid drop recording system having a compact and efficient architecture for multiple fluid drop stream systems wherein each stream is deflected to greater than two flight paths.

These and other objects of the invention are achieved by the present fluid drop recording method and apparatus. A drop generator produces a plurality of drop streams directed toward a target such as plain paper. The drop streams follow generally parallel flight paths to the target where drops from the plural streams collectively make up a record or print. Each stream passes through a charging electrode where selected drops are charged to desired values. Thereafter, the charged drops are deflected by an electric field in their path established by a pair of deflection electrode means. The drops are charged to different values or levels such that each drop stream is able to place a drop on a predetermined number of pixels or print elements within a segment of an ideal row of such elements. The segments addressed by each neighboring stream begin with the next element within the row. Collectively, the plural streams are able to address every print element within a row across the record. The record and drop generator move relative to each other to compose a two dimensional record or print. This defines a conventional rectangular raster pattern but other geometric raster patterns are possible.

Not all pixel locations receive a drop in normal recording operations, obviously. The drops for those pixels are collected by a gutter which in this invention is located inside a deflection plate means having an orifice facing downstream rather than upstream. In other words, the gutter orifice cannot be intercepted by a drop in flight.

In this invention, fluid in the drops are collected in the gutter means after the drop impacts a collision surface near a curved end surface of the deflection means. The surface tension of the fluid is such that the fluid of an impacting drop flows over the collision surface and around the curved end surface. Thereafter, it flows through an orifice into the gutter.

At least every other deflection electrode means includes a collision surface and a curved end surface on left and right sides next to adjacent left and right drop streams. The gutter means is between the two collision surface and both the curved end surface curve toward each other and therefore the common gutter. One clear advantage in addition to compactness, is that the arrangement of one gutter for every two drop streams is maintained.

THE PRIOR ART

U.S. Pat. No. 3,777,307 to Duffield discloses a drop catcher wherein drops from an adjacent drop stream impact a convex catching face of an electrically grounded member. The grounded member is spaced from a charge deflection ribbon thereby creating an electric field between the ribbon and the catcher face in the flight path of the drop stream. Drops deflected by this electric field impact the backwardly sloping upstream portion of the catching face and then flow downwardly along the curving surface to an ingesting blade.

The fluid drop record apparatus described in Duffield, unlike this invention, is of the binary deflection type. A drop stream is provided for each pixel within a row of pixels (or two interleaved rows). Uncharged drops intersect a pixel on the target whereas charged drops impact the above noted upstream portion of the catcher face. The catcher face serves all the drop streams aligned in a row as does the deflection ribbon.

In contrast, the present record apparatus employs a pair of deflection electrode means for each drop stream. Also, the curved end surface is at the downstream end of the deflection electrode means. The gutter is in fact inside a deflection electrode serving two adjacent streams.

U.S. Pat. No. 3,955,203 to Chocholaty is a binary record apparatus like that of Duffield using a different ribbon electrode but the same convex catching face on a grounded member.

U.S. Pat. Nos. 3,786,517 to Krause and 3,877,036 to Loeffler and Weichardt disclose a gutter for every other drop stream such that one gutter serves adjacent streams. Also, the recording apparatus is similar, but not the same as, the present type wherein a pair of electrodes is used for each drop stream. These patents use each nozzle to print a separate character whereas the present system is not so limited to that operation. The similarities stop there, however. The gutter is in the space between the ends of the deflection electrodes and the targets. The present invention includes a technique for removing the gutter from that region.

U.S. Pat. No. 3,893,623 to Toupin describes a fluid drop system that is not a Sweet type system. It discloses a weir positioned at the point of drop formation that traps large diameter drops that follow its surface into a collection pipe.

U.S. Pat. No. 4,035,811 to Paranjpe discloses another biased catcher device suited for use in the binary printing systems of Duffield. In its Fig. 6, fluid from impacted drops is depicted as flowing around a curved end surface integral with the catching surface. Clearly, this does not disclose or suggest the location of a gutter inside a single deflection electrode serving adjacent drop streams in a multiple deflection system. If for no other reason, the bulk of this catcher and that in Duffield makes them unsuited for fitting into the limited space between adjacent drop streams in a multiple deflection path system of the present type.

THE DRAWINGS

The foregoing objects and features of this invention are apparent from the specification and the drawings alone or in combination with each other. The drawings are:

DETAILED DESCRIPTION

Figure 1:
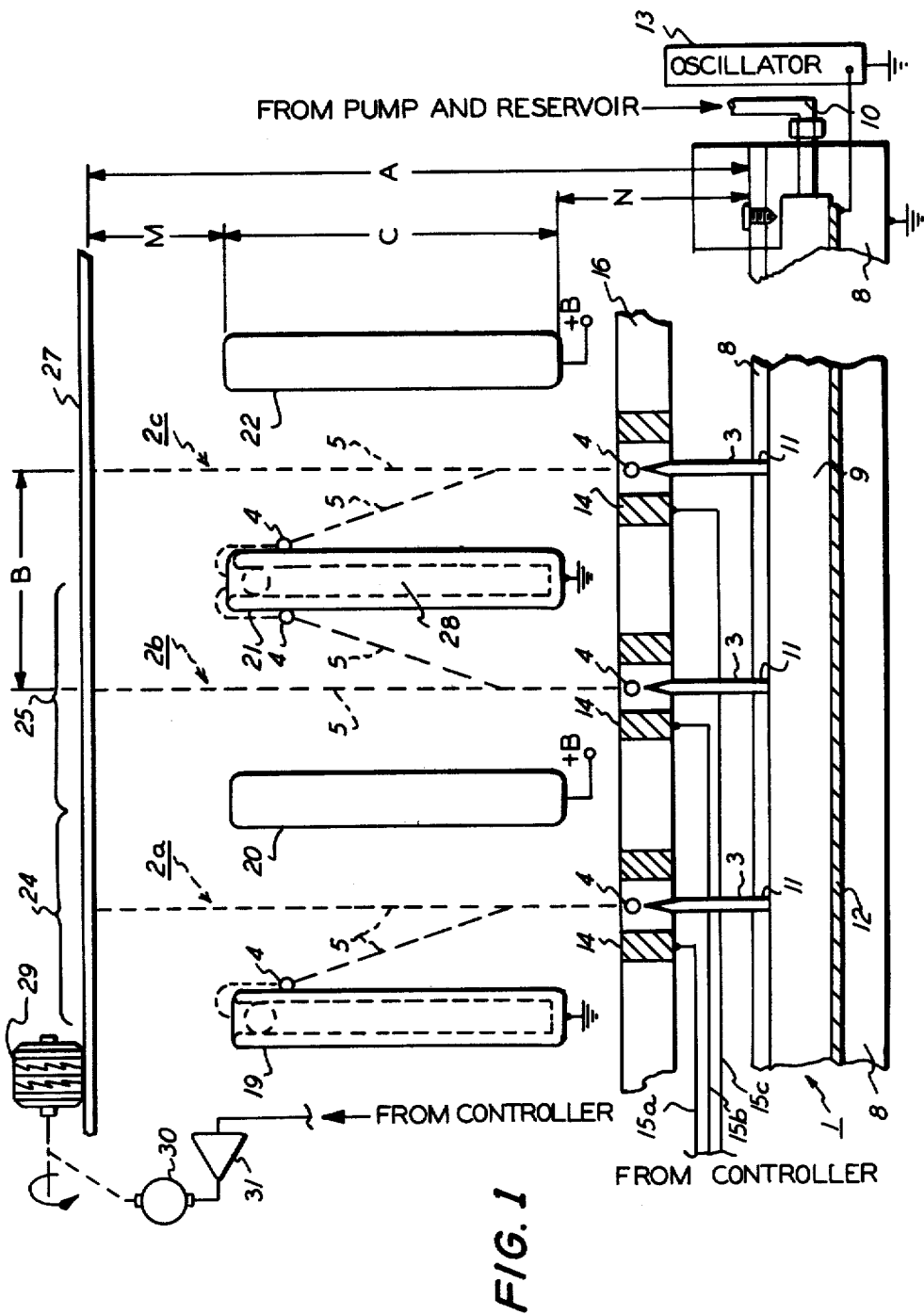
FIG. 1 is a partial, plan view of multiple fluid drop recording systems of the present type wherein every other deflection electrode includes a gutter within its body. The orifice or mouth to the gutter is at the downstream end of the deflection electrode facing the target and is not interceptable by a drop in flight, i.e. the mouth to the gutter is hidden.

The fluid drop recording apparatus of FIG. 1 is of the Sweet type but uses multiple fluid drop streams each capable of independent deflection to a plurality of pixel locations on a target. Drop generator 1 generates a plurality of fluid drop streams. Three exemplary streams 2a, 2b and 2c are shown in FIG. 1. Each drop stream includes a continuous fluid column 3 and individual, discrete fluid drops 4, only a couple of which are shown, with the dashed lines 5 representing the other drops in the stream and the various flight paths possible for the drops.

The drop generator includes a manifold or body 8 which defines a continuous fluid cavity 9. An electrically conductive fluid is supplied under pressure of about 100 pounds per square inch (psi), for example, to the cavity via an inlet conduit 10. The conduit is coupled to a fluid pump (not shown) which in turn is fluid coupled to a reservoir (not shown) of fluid, i.e. a recording ink. The fluid pressure in the cavity causes the drop streams 2 to be emitted through orifices or nozzles 11. The fluid columns 3 break up into discrete drops at fixed distances from the nozzles due to stimulation or oscillation of the fluid pressure at about 100,000 cycles per second, for example, in the cavity by the piezoelectric exciter 12. Exciter 12 is a thin film of polyvinylidene flouride ($PVF_2$) having a conductive coating facing the fluid which in turn is overcoated with an electrically insulating layer to insulate the conductive layer from the ink. A high frequency, low voltage, e.g. 100 volts, electrical signal is applied between the conductive layer and the manifold body which is electrically grounded as is the oscillator 13. The exciter ceates pressure variations in the cavity which promote the break up of the streams into drops at fixed distances from the nozzle.

Drop charging electrodes 14 are located adjacent each stream 2 at the point of drop formation. The fluid is electrically grounded through the manifold 8. An electrical signal is applied over conductors, for example conductors 15a, b and c, to the charging electrodes 14. A potential difference between the charge electrode 14 and the fluid column 3 at or just prior to drop formation results in the drop assuming a zero or a net positive or negative charge depending upon the polarity and magnitude of the voltage applied to the conductors 15. The signals applied to the charging electrodes are video signals that are supplied to the conductors, 15 from a microprocessor or other appropriate controller (not shown).

The charging electrodes 14 are conductive cylinders mounted in a phenolic or other electrically insulating board 16. The conductors 15 preferably are metal conductors on board 16 formed by standard printed circuit board techniques.

As the drops continue their flight along generally parallel paths as shown, they encounter a static electric field between a pair of deflection electrode means. Drop stream 2a encounters a field established by deflection electrodes 19 and 20. The adjacent drop stream 2b encounters a field established by deflection electrodes 20 and 21. The next adjacent drop stream 2c encounters an electric field established by deflection electrodes 21 and 22.

The electric fields are generally transverse to the flight path of a drop and deflect the flight path left or right by an amount related to the amount and polarity of the charge on a drop. The brackets 24 and 25 indicate, respectively, the pixel region on target 27 addressable by the two adjacent drop streams 2a and 2b. These adjacent pixel regions 24 and 25 are typical for all the drop streams. Collectively, the plurality of drop streams are able to address the full width of a recording or printing region on target 27. As the target and drop streams move relative to each other, a full rectangular raster of pixels on the target is addressable by the fluid drops. For example, 204 drop streams, each covering 25 pixels define a single row within a raster pattern having 5100 pixels or picture elements. When spaced over an 8.5 inch, 21.59 centimeters (cm), sheet of plain paper, the 204 drop streams produce a high resolution record of 600 pixels per inch (in the X dimension). This means that the pixel in this example has a width of 0.0042 cm. Since a drop expands to roughly twice its inflight diameter upon impact, a drop size should not exceed about 0.002 cm in diameter.

This invention is especially applicable to ink jet systems that produce records within the range of from 200 to about 800 pixels per inch. This range may be achieved by varying the spacing between nozzles or drop streams and by varying the number of pixels addressed by each nozzle. For an 8.5 inch target, the range for the number of nozzles extends from about 70 to about 400 with the preferred range being around 150 to 250. The range for the number of pixels covered by each nozzle is from about 5 to 50. The drop size of 0.002 cm also is variable for different architectures over the range from about 0.001 cm to about 0.006 cm.

In the embodiment of FIG. 1, the target 27 is moved at a constant velocity upwardly in the direction out of the plane of the page. The tire or wheel 29 represents a transport mechanism for moving the target 27 past the stationary drop generator 1. The tire is driven by an electric motor 30 in turn controlled by the same system controller (not shown) also supplying video signal information to the conductors 15. The amplifier 31 couples the motor to the digital controller.

Figure 3:
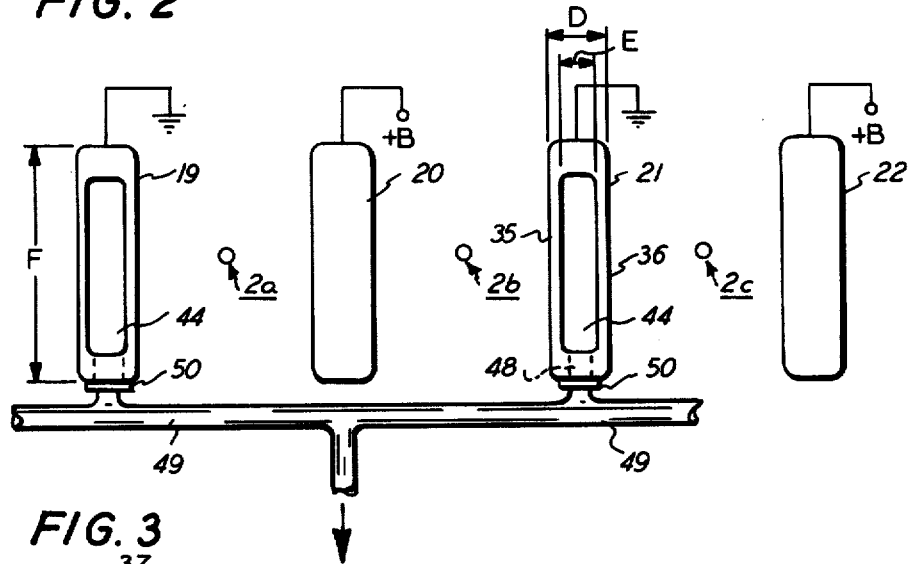
FIG. 3 is an end elevation view of the four deflection electrodes in the system of FIG. 1 with two electrodes being gutter deflection electrodes.

The drops not intended for the target are guttered. The guttered drops are charged appropriately at electrodes 14 to cause them to impact the deflection electrode means of this invention, which includes gutter deflection electrodes 19 and 21 of FIGS. 1 and 3. Electrodes 19 and 21 include the internal gutter, collection device or cavity 28 which receives the fluid from the drops that impact the electrodes. Every other electrode is an electrode such as electrodes 19 and 21. The remaining electrodes such as electrodes 20 and 22 could be replaced with electrodes like 19 and 21 but one gutter would be superfluous. Electrodes 20 and 22 are conductive members having substantially the same external dimensions as electrodes 19 and 21 to obtain uniformity in the deflection fields from drop stream to drop stream.

Figure 4:
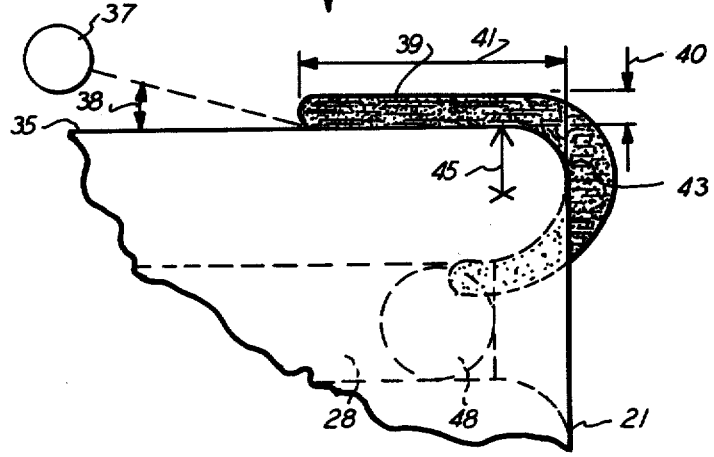
FIG. 4 is an enlarged, partial plan view of one of the collision surfaces and curved end surface of the present gutter deflection eletrode means illustrating a drop before impact, a fluid surface stream extending over the collision surface, around the curved end surface and terminating in the gutter internal to the gutter deflection electrode.

Turning to FIG. 4, the function of the present deflection electrode means and associated gutter is illustrated. The gutter 28 is the cavity within the metal box or housing making up the deflection electrode 19 or 21. The left 35 and right 36 surfaces (see FIG. 3) of a deflection electrode 21 are impacted by drops from adjacent left and right drop streams 2b and 2c. The directions of the electric fields encountered by streams 2b and 2c are opposite to each other as established by the electrical ground potential coupled to electrode 21 and the high positive potentials +B coupled to electrodes 20 and 22. A negative charge of some finite magnitude on a drop in stream 2b pulls that drop to the right into a collision course with surface 35. The same negative charge on a drop in stream 2c pulls that drop left into a collision course with surface 36.

When a drop 37 from stream 2b impacts the collision surface 35 of the deflection electrode 21, it does so—preferably—at an angle 38 of no greater than about eight degrees. The fluid in the impacted drop spreads out several drop diameters laterally and flows as a surface stream 39 forward toward the target 27 due to momentum possessed at impact. The surface tension of the fluid must be great enough for the stream to stay intact. The thickness 40 of the stream is several times less than that of the impacting drop because the volume is displaced laterally on the collision surface 35.

As shown in FIG. 4, the surface stream 39 flows around the curved end surface 43 which is an integral part of the collision surface 35. By integral is meant that the surfaces 35 and 43 are continuous one to the other and not necessarily that they are part of the same piece of material as illustrated. The surface stream in fact makes a 180° turn around curved end surface 43 and passes through the gutter orifice or mouth 44 into the gutter 28. A like process occurs on the right collision surface 36 of gutter deflection electrode 21 and all the other gutter deflection electrodes in the present recording apparatus. The length of the collision surface 41 may vary widely as long as the velocity of drop 37 at impact and the angle of impact 38 enable the surface stream to reach the curved end surface 43. Distance 41 may be near zero or significantly longer than shown as long as a drop has the momentum to flow into the gutter 28. This wide tolerance for the impact point for drop 37 is one of the significant advantages for this invention.

The radius 45 of the curved end surface 43 must be appropriately selected for a given system. The parameters of paramount importance are the velocity of a drop at impact; the angle of impact 38, the surface properties of the collision 35 and curved end 43 surfaces; and the surface tension of the fluid. Suitable values for these parameters are empirically derived. The fluid system under consideration is also susceptible to classical mathematical fluid analysis.

The cylindrical curved end surface 43 shown in the present embodiments is an example. A curved suface having more than one radius could also be used. Also, even with the single radius curve of surface 43, it need not extend a full 180° before flowing through a mouth 44 of an internal gutter 28.

The flow of a surface stream formed from impacting drop around a curved surface, e.g. end surface 43, as reported here, has been previously demonstrated and reported as typified by FIG. 6 in the U.S. Pat. Nos. 4,035,811 to Paranjpe and 3,777,367 to Duffield. However, nowhere in the prior art has it been shown or suggested that this technique could be combined into a deflection plate in the fluid drop system of the present type to enable adjacent drop streams to be collected in a common gutter.

The significance of the present invention—especially in contrast to the Paranjpe and Duffield systems where large lateral space is available for the gutter—is best appreciated by referring to the structure of the deflection electrodes 19 and 21 and the overall systems dimensions. First of all, the nozzle 11 to target 27 distance A depicted in FIG. 1 is about 1.78 centimeters (cm) or 0.7 inch. The nozzle to nozzle spacing B (also shown in FIG. 1) is about 0.106 cm in the case of the earlier example wherein 204 nozzles are spaced over 8.5 inches, i.e. 21.59 cm.

Figure 2:
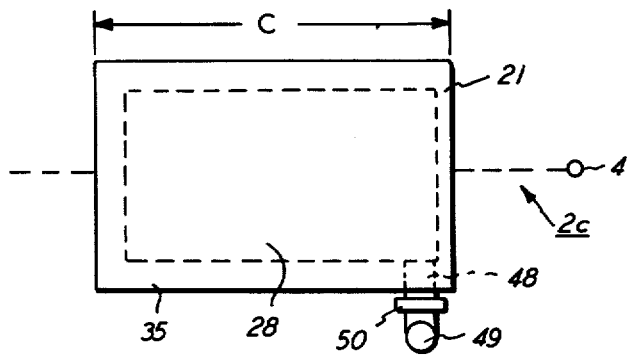
FIG. 2 is a side elevation view of one of the gutter deflection electrodes in the system of FIG. 1.

The length C of the deflection electrodes (see FIG. 2) is about 0.86 cm, 0.34 inch, and its width D (see FIG. 3) is about 0.115 cm, 0.045 inch. The width E (also, FIG. 3) of the gutter mouth 44 is about 0.099 cm, 0.039 inch. The walls of the deflection electrodes 19 and 21 are therefore about 0.008 cm, 0.003 inch thick. By comparison, the diameter of a fluid drop while in flight given in the earlier example of 204 drop streams is about 0.002 cm. The surface stream 39 shown best in FIG. 3 has a thickness much less than the in flight drop diameter. A typical surface stream thickness 40 is about 0.0005 cm. The gutter mouth 44 at 0.099 cm is clearly larger than necessary for accomodating the fluid streams on the left and right collision surfaces 35 and 36 of a deflection electrode 19 or 21. The radius 45 for the cylindrical surface 43 for a wall thickness of 0.008 cm is therefore 0.004 cm.

The width D of the gutter deflection electrodes is important because it must be adequate to house a gutter means that includes a mouth 44 at the downstream end. The width D is variable by factors from about ½D to about 3D to suit the nozzle density associated with the drop stream spacings of from about 70 to 400 over a 21.59, 8.5 inch, record width.

The corners are rounded on both the gutter deflection electrodes 19 and 21 and the conventional electrodes 20 and 22 to minimize high flux density regions. The fields associated with sharp edges can adversely effect the drop deflection process of a recording system.

Because of the small dimensions, the deflection electrodes 19, 21 etc., are manufactured by electroplating them over a mandrel. Removal of the mandrel leaves the cavity or gutter 28 formed internally of the electrode. Also, the drain orifice 48 (see FIGS. 2, 3 and 4) is formed during the electroplating process. The drain 48 is in turn coupled to fluid conduit 49 by appropriate fittings 50. The fluid or ink collected in the plurality of gutter deflection electrodes is fed back to a reservoir (not shown) via conduit 49. The reservoir may be the same one supplying fluid to the cavity 9 in the fluid drop generator 1.

The distance M (see FIG. 1) from the end of the deflection electrode means 19-22, etc., to the target 27 is about 0.61 cm, 0.24 inch, leaving about 0.31 cm, 0.12 inch, for the distance N (see FIG. 1) in which the charging electrodes 14 are inserted. That is, these values of M and N are possible in the presently described embodiment wherein the nozzle to target distance A is sought to be about 1.78 cm. The distance M is of particular critical importance in reducing the overall length A because no space is needed for a separate gutter. The distance M can be reduced in the present embodiment even further if appropriate for a given system architecture. Dimension M is variable over a range from about ½M to about 2M and dimension A is variable over a range from about ¾A to about 1¼A for 200 to 800 pixel per inch recording systems.

Various modifications and changes can be made to the presently described embodiments of the invention. Such modifications and changes are intended to be embraced within the scope of this invention. For example, irregular spacing between every other nozzle can be used to permit the conventional deflection electrodes 20, 22, etc., to be much thinner than those shown since only the gutter deflection electrode means 19, 21, etc., need to have an internal gutter. Also, a negative (below atmospheric) gas pressure can be maintained within the gutters 28 to help pull the collected fluid to the reservoir fed by the conduit 49. In this case, to minimize air currents in the flight paths of drops, the size of the mouth 44 is reduced in height and confined more to the region at the elevation of the drop streams 2a, b, c, d, etc.

I claim:

1. Fluid drop recording apparatus comprising
   drop generator means for generating a plurality of fluid drop streams directed toward a target along flight paths enabling drops from the plural streams collectively to compose a record on a target,
   drop charging means associated with each drop stream for charging drops within each drop stream,
   a pair of deflection electrode means associated with each drop stream having means for coupling to electrical potentials for establishing an electric field in the flight path of a drop stream for deflecting charged drops,
   with at least every other adjacent left and right drop streams being separated by a gutter deflection electrode means including left and right drop collision surfaces interceptable by drops from the left and right streams respectively and left and right curved surfaces integral with the left and right collision surfaces respectively with the curves of each being in the direction of the other and
   gutter means fluid coupled to the left and right curved surfaces of a gutter deflection electrode means for collecting fluid from drops impacting the left and right collision surfaces and flowing thereon around the curved surface to the gutter means.

2. The apparatus of claim 1 wherein the curved end surfaces are single radius curves.

3. The apparatus of claim 2 wherein the curved end surfaces curve about 180° from the plane of the collision surfaces.

4. The apparatus of claim 3 wherein the curved end surfaces include 180° of a cylindrical surface.

5. The apparatus of claim 1 wherein the gutter means is located between the left and right collision surfaces of the gutter deflection electrode means.

6. The apparatus of claim 1 wherein the gutter deflection electrode means includes an electroformed member having left and right walls that include the left and right collision surface, and an end wall that include the left and right curved end surfaces and wherein said gutter means includes the cavity defined by the side and end walls and a mouth to the gutter includes an orifice formed in the end wall between the left and right curved end surfaces.

7. The apparatus of claim 1 wherein the gutter deflection electrodes are arranged to be impacted by drops from left and right drop streams at angles of about 8°.

8. The apparatus of claim 1 wherein the distance from the curved end surface of a gutter deflection electrode and a target is from about 0.30 cm to about 1.20 cm.

9. The apparatus of claim 8 wherein the length of a gutter deflection electrode means is from about 0.60 cm to about 1.0 cm.

10. The apparatus of claim 9 wherein the distance from the drop generator means to a target is from about 1.33 cm to about 3.56 cm.

11. The apparatus of claim 10 wherein the inflight diameter of a drop within a drop stream is from about 0.001 cm to about 0.006 cm.

12. The apparatus of claim 1 wherein the drop stream to drop stream spacing is from about 0.308 cm to about 0.054 cm.

13. Fluid drop recording method comprising
generating a plurality of fluid drop streams directed toward a target along generally parallel flight paths,
charging drops within each drop stream with charging electrodes associated with each drop stream,
deflecting charged drops within each stream to multiple flight paths with electric fields established in the flight paths of the drops between pairs of deflection electrodes associated with each drop stream,
making at least every other deflection electrode a gutter deflection electrode including left and right collision surfaces adjacent left and right drop streams and left and right curved end surfaces fluid coupled with the left and right collision surfaces respectively and
collecting fluid within surface fluid streams formed from drops impacting the left and right collision surfaces of the gutter deflection electrodes within a gutter space located between the left and right collision surfaces and having a mouth coupled to the left and right curved end surfaces whereby the fluid surface streams flow over the collision surfaces, around the curved end surfaces and into the gutter space.

14. The method of claim 13 including the step of forming the gutter deflection electrodes by electroforming left, right and downstream end walls including the left and right collision surfaces, the left and right curved end surfaces and the mouth for entering the gutter space.

* * * * *